United States Patent
Shibata

(10) Patent No.: US 7,436,975 B2
(45) Date of Patent: Oct. 14, 2008

(54) IMAGE READING APPARATUS, IMAGE READING METHOD AND IMAGE READING SYSTEM

(75) Inventor: Koichi Shibata, Sakai (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 682 days.

(21) Appl. No.: 10/316,112

(22) Filed: Dec. 11, 2002

(65) Prior Publication Data

US 2003/0107771 A1 Jun. 12, 2003

(30) Foreign Application Priority Data

Dec. 11, 2001 (JP) ............... 2001-377268

(51) Int. Cl.
*G06K 9/00* (2006.01)
(52) U.S. Cl. .................................... 382/100
(58) Field of Classification Search ............. 382/100; 399/80, 366
See application file for complete search history.

(56) References Cited

U.S. PATENT DOCUMENTS

| 5,583,941 | A | | 12/1996 | Yoshida et al. | |
|---|---|---|---|---|---|
| 5,671,277 | A | * | 9/1997 | Ikenoue et al. | 713/179 |
| 5,974,202 | A | * | 10/1999 | Wang et al. | 382/306 |
| 5,999,766 | A | * | 12/1999 | Hisatomi et al. | 399/80 |
| 6,175,714 | B1 | * | 1/2001 | Crean | 399/366 |
| 6,735,699 | B1 | | 5/2004 | Sasaki et al. | |
| 2001/0028727 | A1 | * | 10/2001 | Naito et al. | 382/100 |
| 2002/0012444 | A1 | * | 1/2002 | Nishikawa et al. | 382/100 |
| 2002/0176116 | A1 | * | 11/2002 | Rhoads et al. | 358/405 |

FOREIGN PATENT DOCUMENTS

| JP | 11-298715 | | 10/1999 |
|---|---|---|---|
| JP | 2000106627 | A | 4/2000 |
| JP | 2000115521 | A | 4/2000 |
| JP | 2000-163488 | A | 8/2000 |
| JP | 2001-257861 | A | 9/2001 |
| JP | 2001-268375 | A | 9/2001 |

OTHER PUBLICATIONS

Japanese Office Action of Japanese Patent Application 2001-377268 dated Apr. 14, 2006 (English language translation included).

* cited by examiner

*Primary Examiner*—Tom Y Lu
(74) *Attorney, Agent, or Firm*—Buchanan Ingersoll & Rooney PC

(57) ABSTRACT

In an image reading apparatus, a user ID is input as login information pertaining to the user who implemented reading of the original document. The user ID is embedded in the image data created from the original document data as an electronic watermark, and the image data is sent to a PC. The PC that receives the image data reads the user ID from the image data. If the user ID read from the image data matches a user ID entered by a user who issued a printing command, the PC issues a print command regarding the image data. Otherwise, printing is prohibited. Through this processing, printing of the image data is permitted only for the user who implemented reading of the image data.

3 Claims, 7 Drawing Sheets

IMAGE READING APPARATUS, IMAGE READING METHOD AND IMAGE READING SYSTEM

This disclosure is based upon Japanese Patent Application No. 2001-377268, filed Dec. 11, 2001, the contents of which are incorporated herein by reference.

BACKGROUND OF THE INVENTION

1. Field of the Invention

The present invention relates to an image reading apparatus, image reading method and image reading system, and more particularly to an image reading apparatus, image reading method and image reading system that are capable of realizing appropriate image data processing.

2. Description of the Prior Art

Multi-function peripherals (MFPs) used in networks have a function to transmit scanned image data to a different apparatus, such as a PC, over a network. Generally, an MFP sends image data only.

However, an MFP can freely perform printing or copying with regard to the image data that it sends or receives, giving rise to a security problem with regard to such image data. For instance, it may be desirable to have the document image viewable by a number of people, but to limit the ability to print the image, and thereby prevent unauthorized reproductions of the image.

In addition, the problem exists that because only image data is sent, the characteristics of the image, the characteristics of the scanner used, etc. are unclear, and therefore appropriate processing may not be performed.

With the foregoing in view, the present invention aims to provide an image reading apparatus, an image reading method and an image reading system that can realize appropriate processing of image data.

SUMMARY OF THE INVENTION

In accordance with the invention, when an image is scanned to generate image data for transmission to a computer, additional information is incorporated into the image data in the form of an electronic watermark. The electronic watermark preferably has the characteristics that it can be readily detected by the receiving computer, to decode the additional information, but is not easily visible to the naked eye, so as to not to disrupt the printed image. The additional information can be of different types, in accordance with the application of the invention.

In one implementation, the additional information can be an identification of a user who scanned the image. At the computer which receives the image data, the user ID incorporated into the image data can be compared to the identification of a user who issues a print command. If the ID's do not match, printing can be prohibited, to thereby prevent unauthorized reproduction of the image. In a variation of this implementation, a group of authorized users can be associated with the ID of the user who scanned the image, to enable the image to be printed by a limited number of people.

In another implementation, the additional information can pertain to attributes of the image and/or characteristics of the scanner or transmission mode. At the receiving computer, this information can be employed to perform appropriate processing of the image data, e.g., color correction.

Further features of the invention, and the advantages achieved thereby, are described hereinafter with reference to exemplary embodiments illustrated in the accompanying figures.

DETAILED DESCRIPTION OF THE PREFERRED EMBODIMENTS

Embodiments of the present invention are described below with reference to the drawings. In the description below, identical components and constituent elements have identical numbers. They also share the same names and functions. Therefore, a detailed explanation will not be repeated for these identical components and constituent elements.

First Embodiment

Figure 1:
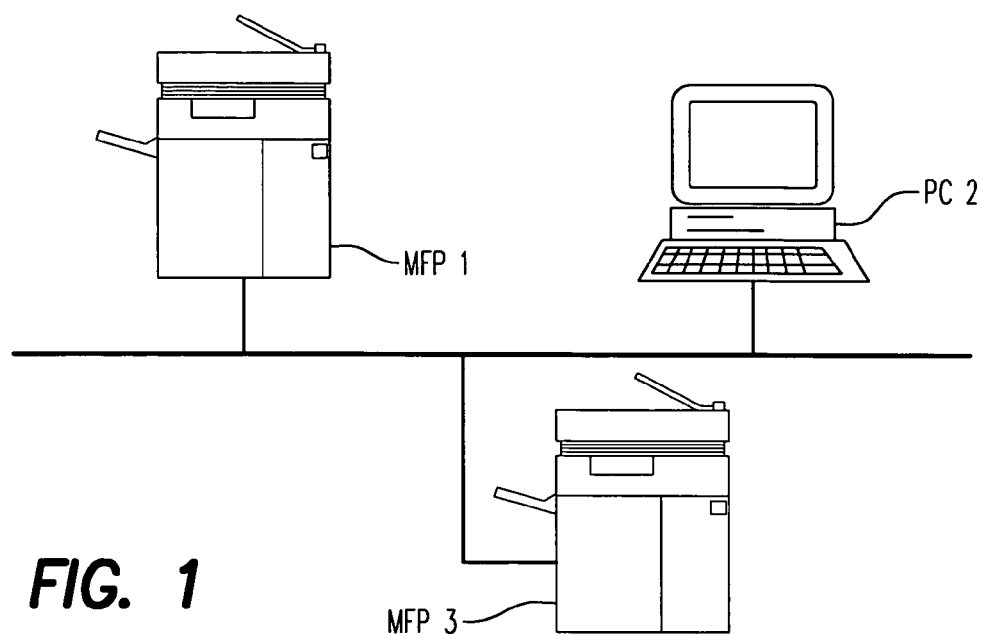
FIG. 1 is a drawing showing the construction of an image reading system pertaining to a first embodiment of the invention.

FIG. 1 is a drawing showing the construction of an image reading system pertaining to a first embodiment of the invention. With reference to FIG. 1, the image reading system includes an MFP 1, which is an image reading apparatus connected over a network, and a personal computer (hereinafter "PC") 2.

The MFP is a multi-functional peripheral used in a network. The term 'MFP' refers to an image processing apparatus such as a printer, a copying machine or a scanner having a communication function. In this embodiment, the MFP 1 is an image reading apparatus such as a scanner, and will be described as a multi-function device having an image reading function and a printing function, but in the case of an apparatus that has only an image reading function, other MFPs having a printing function, such as an MFP 3, may be included in the image reading system.

In addition, a different communication device such as a PDA (personal digital assistant) or a communication terminal may be included in place of the PC 2. In this case, such a device includes the same functions and performs the same operations as the PC 2 described below.

Figure 2:
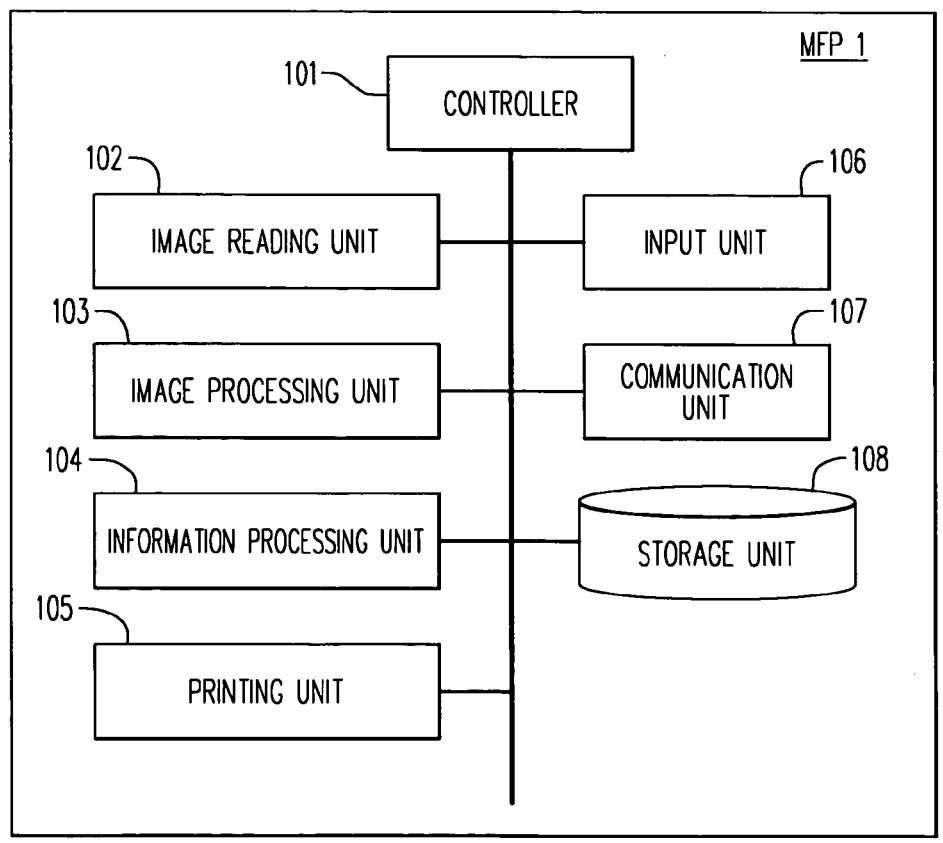
FIG. 2 is a block diagram showing the construction of the MFP 1 shown in FIG. 1.

FIG. 2 is a block diagram showing the construction of the MFP 1 shown in FIG. 1. With reference to FIG. 2, the MFP 1 includes a controller 101, an image reading unit 102, an image processing unit 103, an information processing unit 104, an image printing unit 105, an input unit 106, a communication unit 107 and a storage unit 108.

The controller 101 carries out overall control of the MFP 1. In this embodiment, the user who uses the MFP 1 must perform a login operation. Accordingly, the user who uses the MFP 1 inputs login information such as a user ID via the input unit 106.

The input unit 106 includes a button or touch panel input device, or the like, having a key input function or a touch input function. The user can input login information comprising numbers or the like via an input unit 106 having such a construction.

Where the login information is biometric data such as fingerprint information or the like, the input unit 106 can be a fingerprint sensor or the like, and where the login information is iris information or voice print information, the input unit 106 may be an iris sensor, a microphone or the like.

The storage unit 108 stores programs executed by the controller 101, and also serves as a temporary storage area for the execution of a program by the controller 101. The storage unit 108 also stores user information such as the login information input by the user.

When a logged-in user places an original document on the MFP and inputs an image reading command via the input unit 106, the image reading unit 102 reads the original document thus placed.

The image processing unit 103 generates image data comprising bitmap data or the like based on the original document image read by the image reading unit 102.

The information processing unit 104 performs information processing in which various types of information are embedded in the image data generated by the image processing unit 103. For the information-embedding processing, electronic watermark technology may be used as an example. For instance, a distinct set of information may be embedded in the image data by manipulating a bit array that expresses the brightness of the pixels that constitute the image.

The image printing unit 105 prints the image data generated by the image processing unit 103. The communication unit 107 comprises a communication interface or the like and performs transmission and receipt of image data over a network.

The MFP 1 shown in FIG. 2 has the construction of a common image reading apparatus and is not limited to the construction described above.

Figure 3:
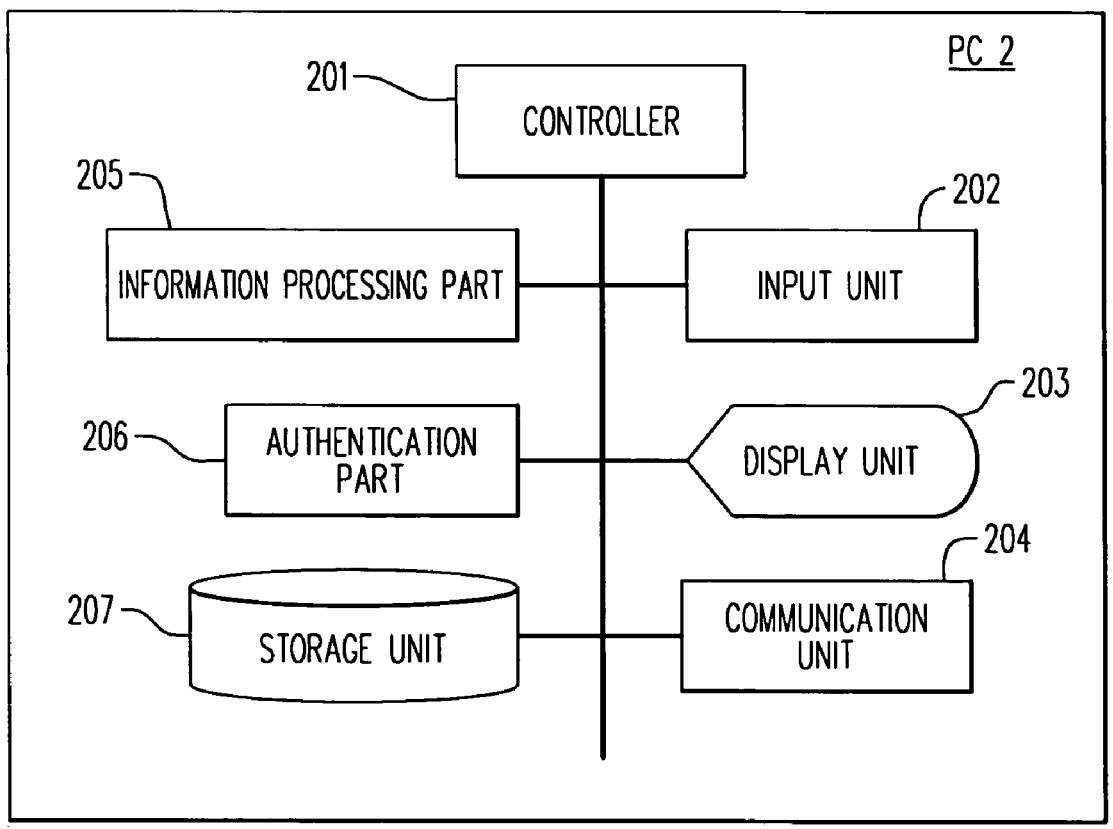
FIG. 3 is a block diagram showing the construction of the PC 2 shown in FIG. 1.

FIG. 3 is a block diagram showing the construction of the PC 2 shown in FIG. 1. With reference to FIG. 3, the PC 2 includes a controller 201 that performs overall control of the PC 2, an input unit 202 having a keyboard and a mouse or the like that enables input of various types of information and commands, a display unit 203 that performs display of various types of information, a communication unit 204 forming a communication interface or the like, an information processing unit 205 that performs processing based on the information embedded in the received image data, an authentication unit 206 that performs user authentication, and a storage unit 207 that stores programs executed by the controller 201 and also serves as a temporary storage area for the execution of a program by the controller 201.

The PC 2 shown in FIG. 2 has the construction of a common PC and is not limited to the construction described above.

In the image reading apparatus described above, the image data read by the MFP 1 is transmitted to the PC 2. The PC 2 performs various types of processing with regard to the received image data.

The processing performed by the MFP 1 will first be described. The description here will pertain to a situation in which a user ID is input as the login information for the MFP 1.

Figure 4:
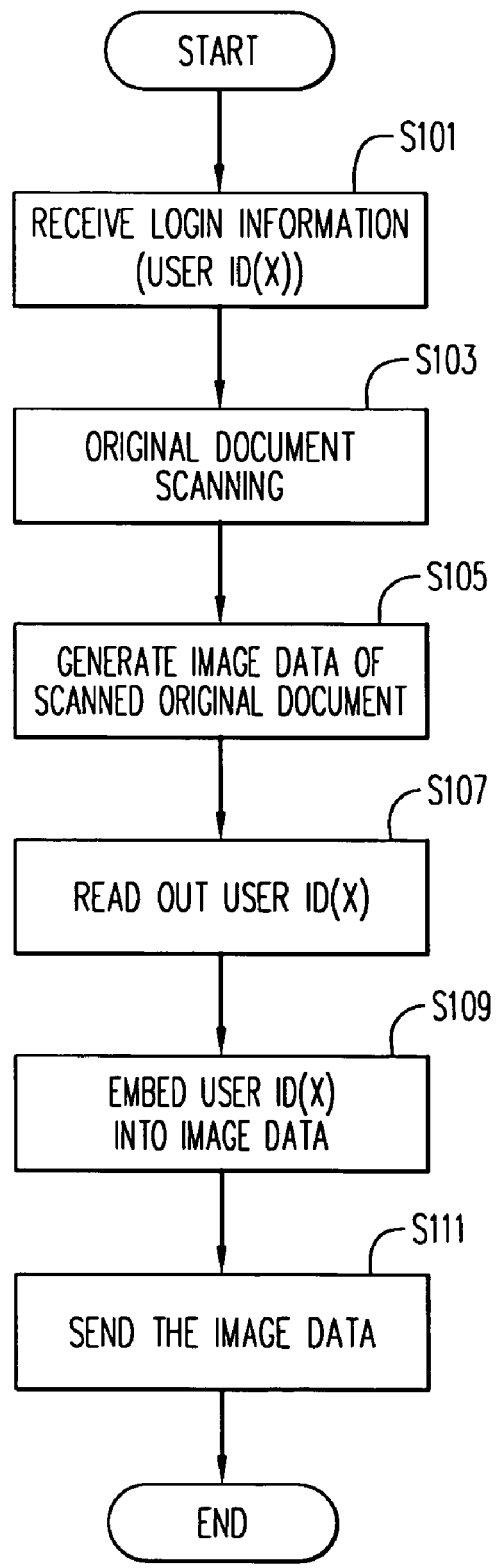
FIG. 4 is a flow chart showing the processing performed by the MFP 1 in the first embodiment.

FIG. 4 is a flow chart showing the processing performed by the MFP 1 pertaining to the first embodiment. The processing routine shown in the flow chart of FIG. 4 is realized via execution by the controller 101 of the MFP 1 of a program stored in the storage unit 108.

With reference to FIG. 4, the input of a user's personal identification ID(X) via the input unit 106 is received from the user who uses the MFP 1 (S101). The user ID(X) input by the user in step S101 is stored in the storage unit 108.

Following the login, the original document set by the user is scanned and read by the image reading unit 102 (S103).

The original document data read in step S103 is converted into electronic data by the image processing unit 103, whereby image data is generated (S105).

The information processing unit 104 reads the user ID(X) input by the user in step S101 from the storage unit 108 (S107), and embeds it in the image data generated in step S105 as an electronic watermark (S109). In this embodiment, the method of embedding used in step S109 is not limited to any specific method. Examples of suitable methods for embedding an electronic watermark in the context of the present invention are disclosed in U.S. Pat. Nos. 5,583,941 and 5,671,277, and Japanese Laid-Open Application No. 11-298715, the disclosures of which are incorporated herein by reference. Briefly, in the techniques described in these references, electronic data is embedded in a document by adjusting the density, or gray scale, values of certain pixels in the image data, in accordance with the values of the bits of the embedded data. The amount of adjustment is preferably sufficient to be detected by the PC 2, but not easily visible to the naked eye. The location of the pixels that are adjusted to embed the data can be predetermined ahead of time, either explicitly or by means of a formula, or could be indicated by a pointer inserted at an inconspicuous location on the document, e.g., the upper left corner.

The image data in which the user ID(X) has been embedded in step S109 is transmitted by the communication unit 107 to the PC 2 using FTP (file transfer protocol) or the like (S111). The routine executed by the MFP 1 is thereby completed.

The processing that takes place in the PC 2 will now be described. The description provided here pertains to a situation in which printing is performed using the MFP 1 or by a different printing apparatus such as the MFP 3.

Figure 5:
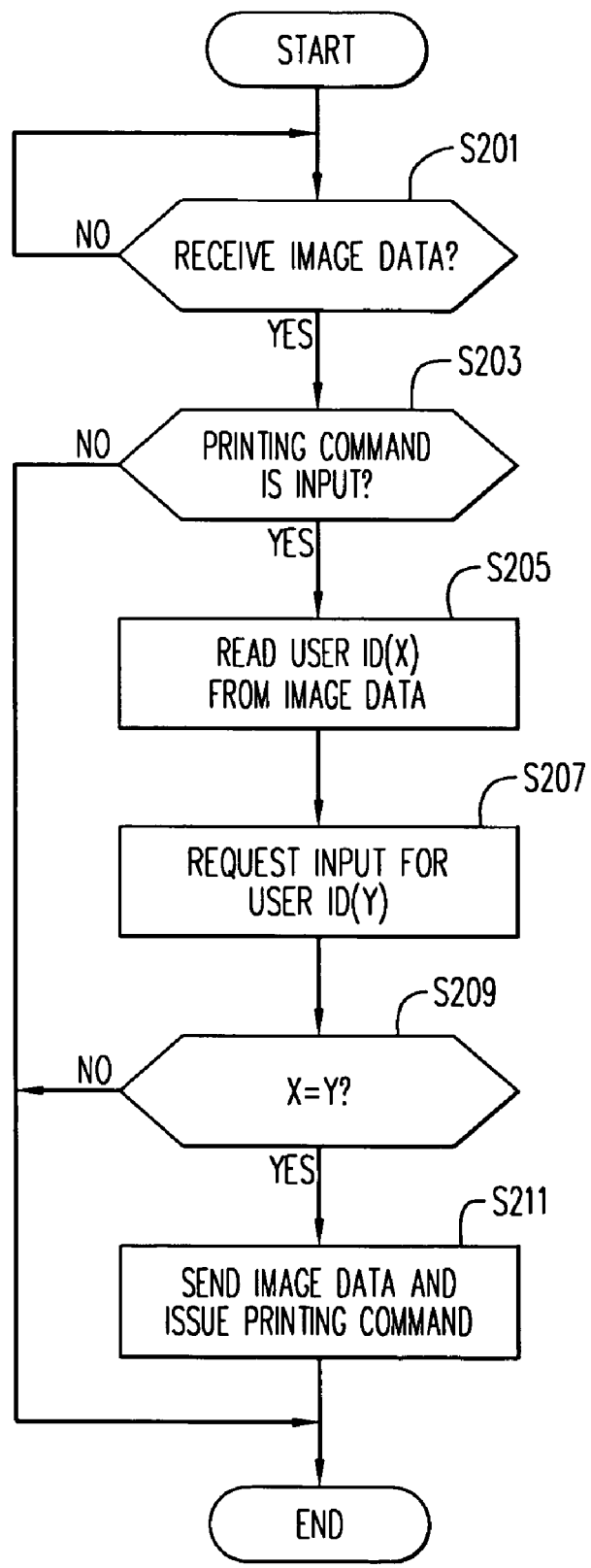
FIG. 5 is a flow chart showing the processing performed by the PC 2 in the first embodiment.

FIG. 5 is a flow chart showing the processing executed by the PC 2 pertaining to the first embodiment. The processing routine shown in the flow chart of FIG. 5 is realized by the controller 201 of the PC 2 via execution of a document management program or the like stored in the storage unit 207.

With reference to FIG. 5, when the communication unit 204 receives the image data from the MFP 1 over a network (YES in S201) and an input of a printing command is received from the user for the image data via the input unit 202 (YES in S203), the information processing unit 205 reads the embedded user ID(X) from the image data (S205). Thus, in the case of the embedding techniques described in the foregoing references, the information processing unit 205 detects the density values of the pixels at the designated location in the document image, and converts those levels into bit information.

The controller 201 then, via the print-out dialog box displayed on the display unit 203, requests the input of the user ID(Y) of the user who input the printing command with regard to the image data (S207).

When the user ID(Y) of the user that was input via the input unit 202 matches the user ID(X) embedded in the image data that was read in step S205 (YES in S209), the controller 201 sends the image data to the MFP 1 or other printing apparatus such as the MFP 3 and issues a printing command (S211).

When the user ID(Y) of the user that was input via the input unit 202 does not match the user ID(X) embedded in the image data that was read in step S205 (NO in S209), the image data is not processed for printing. Alternatively, a user ID error display may be shown on the display unit 203, and the input of the user ID(Y) performed in step S207 may be requested once more. The routine executed by the PC 2 is thereby completed.

In this image reading system, through the routines described above, the image is processed for printing only when the identification of the user who implements reading of the image data using the MFP 1 matches that of the user who inputs the printing command in the PC 2, and when they do not match, processing for printing does not take place. In other words, by embedding the user's login information in the image data, printing of the image data by a user who is not the original user can be prohibited.

In addition, by embedding printing prohibition information in place of the user's ID, a printing operation by all users can be prohibited. By embedding information such as the name or the like of the creator of the image data, such information can be printed over the image data when the image data is processed for printing. Consequently, printing without the permission of the creator of the image read by the image reading apparatus or the user who implemented reading can be prohibited.

As described above, by embedding various types of information in image data read by the image reading apparatus, conditions that prohibit or restrict various types of processing can be specified with regard to the image data, ensuring high-security processing of the image data.

Modification

The first embodiment above was described with regard to a situation in which restricting conditions that allow only the user who implemented reading of an image via the MFP 1 to print the image, but in this modification, a situation will be described in which a user or users other than the user who implemented reading are specified as a user or users who are permitted to, print the image data.

Figure 6:
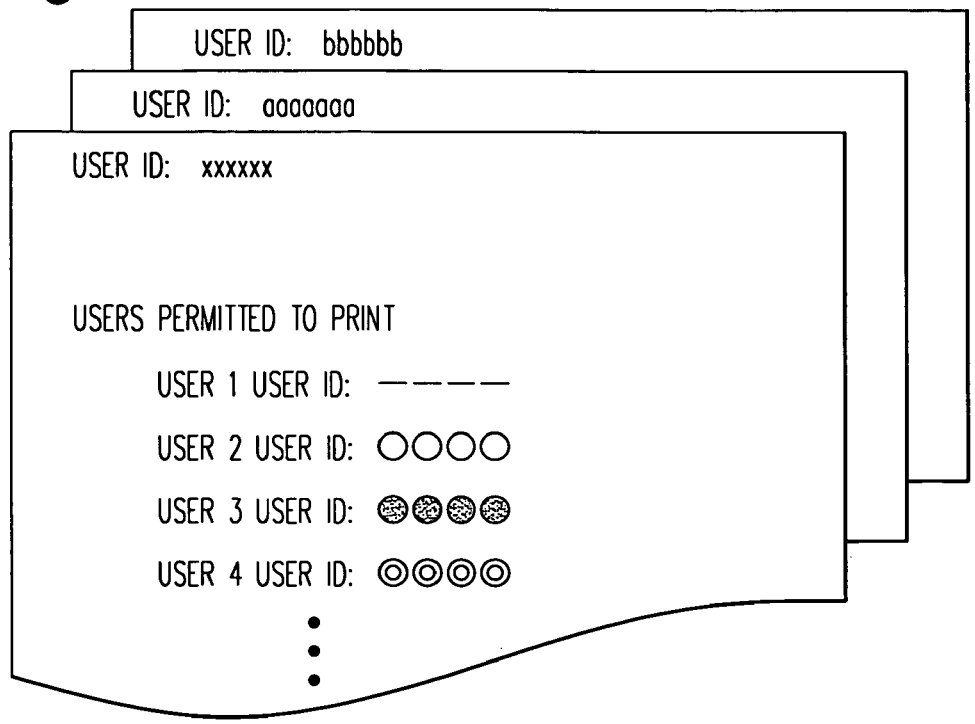
FIG. 6 is a drawing showing a first specific example of user information stored in the storage unit 108 of the MFP 1.

FIG. 6 is a drawing showing a first specific example of user information stored in the storage unit 108 of the MFP 1.

With reference to FIG. 6, in the first specific example of the modification, the user IDs for users permitted to implement printing are stored in advance for each user as user information.

When a user who implemented reading of an image using the MFP 1 inputs his user ID(X) in step S101 shown in FIG. 4, the information processing unit 104 reads the user IDs of users who are permitted to implement printing of the image data, as shown in FIG. 6, from the user information stored in the storage unit 108 based on the input user ID(X). In step S109 of FIG. 4, the user IDs of the users permitted to implement printing of the image data, which are read from the user information above, are embedded as electronic watermarks in place of, or in addition to, the user ID(X) of the user who implemented reading of the image data.

The PC 2 that has received the image data described above then executes the routine of the document management program shown in the flow chart of FIG. 5 above. Here, the user IDs for all users permitted to implement printing are read in step S205.

By embedding restricting conditions in image data in this way as shown in FIG. 6, printing of the image data is permitted only for users specified in advance, while printing by other users is prohibited.

Figure 7:
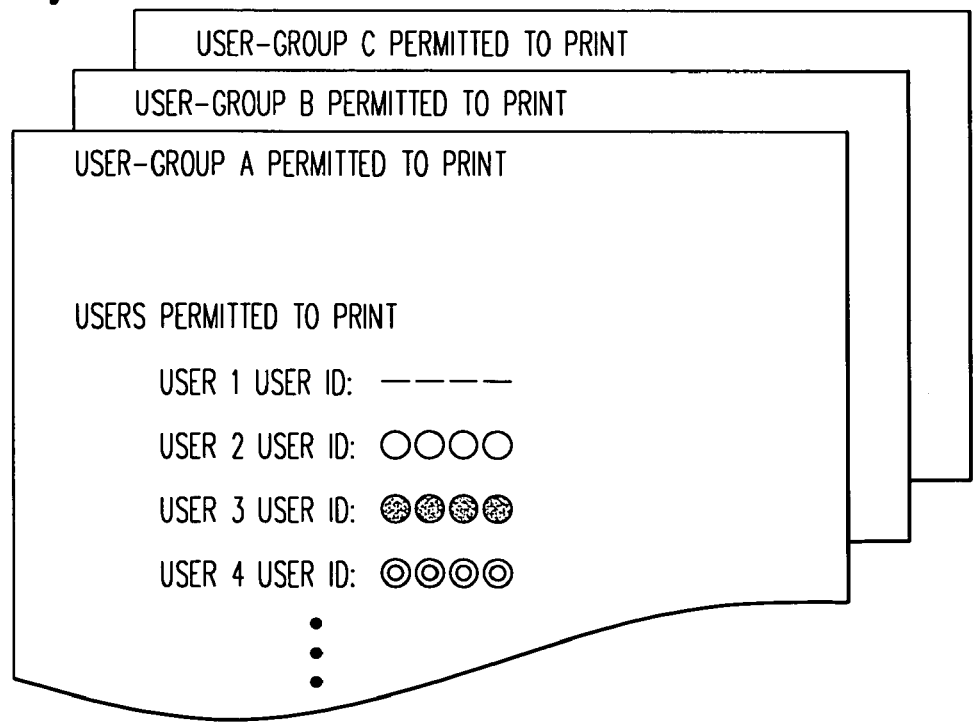
FIG. 7 is a drawing showing a second specific example of user information stored in the storage unit 108 of the MFP 1.

FIG. 7 is a drawing showing a second specific example of user information stored in the storage unit 108 of the MFP 1.

With reference to FIG. 7, in the second modification examples, the user IDs for member users are stored in advance for each group of users permitted to implement printing, as user information. Specifically, the user IDs for members who belong to a prescribed department or section or the user IDs for members who are to attend a prescribed meeting are stored in memory.

When the user who implements reading of an image using the MFP 1 inputs his user ID(X) in step S101 shown in FIG. 4, the information processing unit 104 reads the groups of users who are permitted to implement printing of the image data, which are shown in FIG. 7, from the user information stored in the storage unit 108 based on the input user ID(X). The user IDs for users permitted to implement printing may be read based on a selection made by the user via the input unit 106 who implements reading of the image of a group for which printing of the image data should be permitted from among the groups thus read, or through automatic selection of a group for which printing of the image data should be permitted based on the user ID(X) input by the user who implements reading of the image. In step S109 of FIG. 4, the user IDs of the users belonging to the group permitted to implement printing of the image data, which were read from the above user information, are embedded as electronic watermarks in place of the user ID(X) of the user who implemented reading of the image data.

Subsequently, the PC 2 that received the above image data executes the routine of the document management program shown in the flow chart of FIG. 5 above. Here in step S205, the user IDs of all the users belonging to the group permitted to implement printing are read.

By embedding restricting conditions in image data in this way as shown in FIG. 7, printing of the image data is permitted only for the users who belong to a specific group, while printing by any other users is prohibited.

Second Embodiment

The second embodiment will be described using a situation in which, in place of prohibiting conditions or restricting conditions regarding the processing of the image data, output conditions are set based on various types of processing that are to be performed regarding the image data.

Because the construction of the image reading system of the second embodiment is identical to that of the first embodiment shown in FIGS. 1-3, it will not be described again here.

Figure 8:
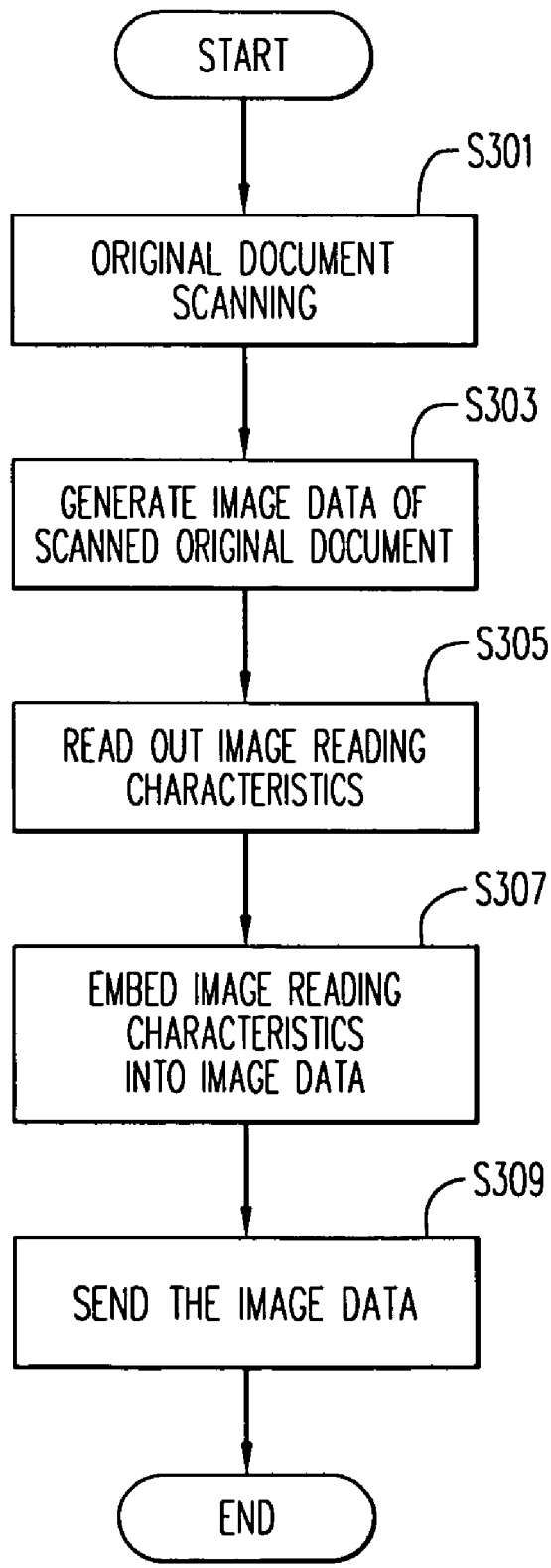
FIG. 8 is a flow chart showing the processing performed by the MFP 1 in the second embodiment of the invention.

FIG. 8 is a flow chart showing the processing performed by the MFP 1 pertaining to the second embodiment. The processing routine shown in the flow chart of FIG. 8 is realized by the execution by the controller 101 of the MFP 1 of a program stored in the storage unit 108.

With reference to FIG. 8, the original document placed on the MFP 1 by the user is first read by the image reading unit 102 (S301).

The original document data read in step S103 is converted into electronic data by the image processing unit 103, whereby image data is generated (S303).

The information processing unit 104 also reads information such as the image reading characteristics of the MFP 1 or the like as image characteristic information (S305). The image characteristic information read in step S305 can include such information as the CCD's (charge coupled device) reading characteristics, i.e., brightness variation and color variation, MFP 1 model characteristics, the data compression format and/or the scanning method.

The information processing unit 104 embeds the image characteristic information read in step S305 in the image data generated in step S303 as an electronic watermark (S307). The method of embedding used in step S307 is not limited to any specific method in this embodiment, and can be, for example, any of the methods referenced previously.

The image data in which the image characteristic information has been embedded in step S307 is transmitted to the PC 2 by the communication unit 107 using FTP (file transfer protocol) or the like (S309). The routine performed by the MFP 1 is thereby completed.

The processing performed by the PC 2 will now be described. In this embodiment, a situation in which printing is performed using the MFP 1 or other printing apparatus such as the MFP 3 will be described.

Figure 9:
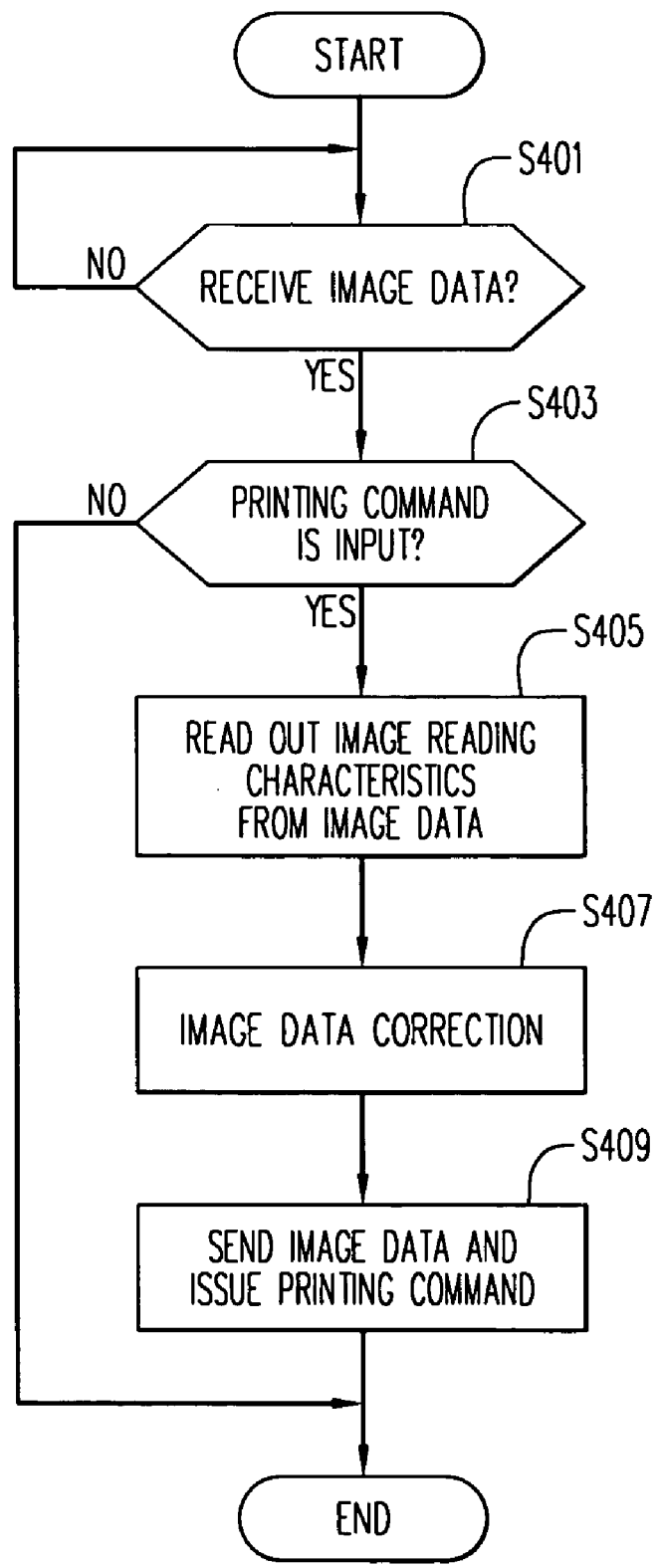
FIG. 9 is a flow chart showing the processing performed by the PC 2 in the second embodiment.

FIG. 9 is a flow chart showing the processing performed by the PC 2 pertaining to the second embodiment. The processing routine shown in the flow chart of FIG. 9 is realized through execution by the controller 201 of the PC 2 of a document management program or the like stored in the storage unit 207.

With reference to FIG. 9, when the communication unit 204 receives the image data from the MFP 1 over a network (YES in S401) and the input of a printing command is received from the user for the image data via the input unit 202 (YES in S403), the information processing unit 205 reads the embedded image characteristics from the image data (S405).

The information processing unit 205 performs correction of the image data received in step S401 based on the image characteristic information read in step S405, specifies output of the image data to the MFP 1 or other printing apparatus such as the MFP 3 (S407) and issues a print command (S409). Correction of the image data executed in step S407 refers to correction of brightness and color, correction pertaining to the data compression method, correction pertaining to the scanning method or the MFP 1 model characteristics, etc., according to the image characteristic information embedded in the image data. The routine performed by the PC 2 is thereby completed.

Because the above routines are performed in the image reading system, the image data read by the MFP 1 can be output in an optimal condition. In other words, by embedding the CCD's reading characteristic information such as brightness variation and color variation in image data as an electronic watermark, the PC 2 that receives image data can automatically perform correction regarding the brightness or the like of the image data and print out the image data in an optimal condition. By embedding information regarding the image data compression method or scanning method in the image data as an electronic watermark, the PC 2 that received the image data can automatically build the image data read by the MFP 1. In addition, by embedding information such as the model characteristics of the MFP 1 used to read the image data in the image data as an electronic watermark, the PC 2 that received the image data, if equipped with functions to perform corrections corresponding to the model characteristics, can perform such corrections and print out the image data in an optimal condition.

In connection with the first and second embodiments above, situations were described in which the image data received by the PC 2 is printed, but the present invention is not limited to implementation in printing, and may be applied to other types of processing executed by the PC based on image data, such as display or copying.

Furthermore, the data communication method used in the image reading system described above may be provided as a program. Such a program is a computer-readable program.

The program can be provided as a program product by recording it on a recording medium that can be used with a computer, such as a flexible disk, a CD-ROM, a ROM, a RAM or a memory card. Alternatively, the program can be provided by recording it on a recording medium that is installed in the computer, such as a hard disk. In addition, the program can be provided via downloading over a network.

The program product thus provided is installed in a program storage unit such as a hard disk for execution.

The program product includes the program itself and the recording medium on which the program is recorded.

The embodiments disclosed herein are examples in every aspect and do not limit the present invention in any respect. The scope of the present invention is indicated not by the description provided above but by the claims, and is intended to include constructions equivalent to the claims, as well as all changes and modifications within the scope thereof.

What is claimed is:

1. An image reading system comprising an image reading apparatus and an information processing apparatus that communicate with each other over a communication circuit, wherein said image reading apparatus comprises:

first input means that inputs first login information regarding a first user who implements reading of image data using said image reading apparatus;

a reading device that reads an original document and converts the image thereof into image data;

embedding means that embeds said input first login information in said image data;

transmitting means that sends said image data in which said first login information is embedded to said information processing apparatus over said communication circuit, and;

wherein said information processing apparatus includes:

receiving means that receives said image data from said image reading apparatus over said communication circuit;

reading means that reads said embedded first login information regarding said first user from said received image data;

display means that displays a screen to request input of second login information regarding a second user when a command is input by said second user to process said image data using said information processing apparatus;

second input means that inputs said second login information regarding said second user; and command means that issues a command to an image processing unit to process said image data when said read first login information and said input second login information match each other, wherein the image reading apparatus comprises the image processing unit.

2. An image reading system, comprising an image reading apparatus and an information processing apparatus that communicate with each other over a communication circuit, wherein said image reading apparatus comprises:

a first input unit that inputs first login information regarding a first user who implements reading of image data using said image reading apparatus;

a reading device that reads an original document and converts the image thereof into image data;

an embedding unit that embeds said input first login information in said image data;

a transmitting unit that sends said image data in which said first login information is embedded to said information processing apparatus over said communication circuit, and wherein said information processing apparatus includes:

a receiving unit that receives said image data from said image reading apparatus over said communication circuit;

a reading unit that reads said embedded first login information regarding said first user from said received image data;

a display unit that displays a screen to request input of second login information regarding a second user when a command is input by said second user to process said image data using said information processing apparatus;

a second input unit that inputs second login information regarding said second user; and a command issuing unit that issues a command to an image processing unit to process said image data when said red read first login information and said input second login information match each other, wherein the image reading apparatus comprises the image processing unit.

3. An image processing method executed in an image reading system comprising an image reading apparatus and an information processing apparatus that communicate with each other over a communication circuit, said image processing method comprising the steps of:

receiving input of first login information regarding a first user who implements reading of image data by said image reading apparatus;

reading an original document and converting the image thereof into image data by said image reading apparatus;

embedding said input first login information in said image data by said image reading apparatus;

sending said image data in which said first login information is embedded from said image reading apparatus to said information processing apparatus over said communication circuit, and receiving said image data sent from said image reading apparatus by said information processing apparatus;

reading said embedded first login information regarding said first user from said received image data by said information processing apparatus;

displaying a screen to request input of second login information regarding a second user by said information processing apparatus when a command is input by said second user to process said image data using said information processing apparatus;

receiving input of said second login information regarding said second user by said information processing apparatus; and issuing a command to an image processing unit to process said image data when said read first login information and said input second login information match each other, wherein the image reading apparatus comprises the image processing unit.

* * * * *